3,354,090
PREPARATION OF STABLE, FREE-FLOWING MIXTURES OF ALKALI METAL DICHLOROISOCYANURATES AND SODIUM TRIPOLYPHOSPHATE
Russell R. Keast, Yardley, Pa., assignor to FMC Corporation, New York, N.Y., a corporation of Delaware
No Drawing. Filed June 1, 1965, Ser. No. 460,501
12 Claims. (Cl. 252—99)

ABSTRACT OF THE DISCLOSURE

A stable, free-flowing mixture of an alkali metal dichloroisocyanurate and a hydratable salt is produced by reacting trichloroisocyanuric acid and an alkali metal cyanurate in a reaction mixture containing at least 11% by weight water, and adding a hydratable salt to the reaction mixture to absorb the water in said reaction mixture as water of hydration and to obtain a water content in the resulting final mixture, including the reaction mixture and the hydratable salt, of no greater than about 16% by weight of said final mixture.

---

This invention relates to the preparation of mixtures of alkali metal dichloroisocyanurate and a hydratable salt which are fast-dissolving, noncaking, stable, and free-flowing, and, more specifically, to a method of preparing mixtures of alkali metal dichloroisocyanurate salts and sodium tripolyphosphate in which the alkali metal dichloroisocyanurate is prepared from trichloroisocyanuric acid.

Mixtures of alkali metal dichloroisocyanurates, e.g. sodium or potassium dichloroisocyanurate, and cleaning agents, e.g. sodium tripolyphosphate, can be prepared by blending each of these separately prepared compounds together in desired proportions to produce useful cleaners. In the preparation of such mixtures an alkali metal dichloroisocyanurate is preferred as the chlorine yielding agent because it is fast dissolving and has increased stability against decomposition on storage, without concomitant loss of available chlorine, over trichloroisocyanuric acid or dichloroisocyanuric acid. However, it is desirable to use trichloroisocyanuric acid in place of the alkali metal dichloroisocyanurates because the acid can be produced more cheaply.

As a result there is a need for a commercial method for producing dry, free-flowing, stable mixtures of alkali metal dichloroisocyanurate with added cleaning agents in which the isocyanurate is derived from the more inexpensively produced trichloroisocyanuric acid.

It is an object of the present invention to satisfy this need by the present process.

It is a further object to produce dry, free-flowing, stable, fast-dissolving mixtures of an alkali metal dichloroisocyanurate and hydratable salts which are stable against loss of active chlorine and in which the isocyanurate compound is derived from trichloroisocyanuric acid.

It has been found that a dry, free-flowing, stable mixture of an alkali metal dichloroisocyanurate and a hydratable salt can be produced by reacting trichloroisocyanuric acid and an alkali metal cyanurate in a reaction mixture containing at least about 11% by weight of water, at a temperature of up to about 80° C. until the reaction is completed, and then adding a hydratable salt to the above reaction mixture in amounts sufficient to absorb all of the water in the reaction mixture as water of hydration and to obtain a water content in the resulting final mixture, including the reaction mixture and the hydratable salt, of no greater than 16% by weight of the final mixture, and recovering a free-flowing, stable, fast-dissolving final mixture of an alkali metal dichloroisocyanurate and said salt.

When the hydratable salt is sodium tripolyphosphate the final product is a mixture of an alkali metal dichloroisocyanurate and either a partially or totally hydrated sodium tripolyphosphate.

In carrying out the present invention the preferred procedure is to dissolve an alkali metal hydroxide in water such that the molar ratio of the alkali metal hydroxide to water is 1:4. To this mixture is added powdered isocyanuric acid in a molar ratio of isocyanuric acid to alkali metal hydroxide of 1:3. This results in the formation of an alkali metal cyanurate solution, and preferably, a trialkali metal cyanurate solution. If desired, an equivalent mixture can be obtained by adding the corresponding alkali metal cyanurate to water. In either case the result is an aqueous solution of an alkali metal cyanurate.

The term "alkali metal" as used in this specification and claims refers to any of the alkali metals including the alkaline earth metals, with sodium and potassium being the preferred embodiments.

To the above solution is added trichloroisocyanuric acid in a molar ratio of trichloroisocyanuric to the alkali metal cyanurate of 2:1 to form the reaction mixture. During the addition of the trichloroisocyanuric acid the reaction becomes exothermic and the temperature of the mixture rises. The temperature of the reaction mixture should be maintained below about 80° C. by slowly adding the trichloroisocyanuric acid to the mixture and/or using cooling equipment to keep the temperature from rising beyond about 80° C. Temperatures higher than 80° C. are not desired because increasing amounts of chlorine values are lost at the higher temperatures. Temperatures of from about ambient (15° C.) to as high as 80° C. can be used with good results. However, at lower reaction temperatures longer reaction times are required. A preferred range is from about 60° to 80° C.

After all of the trichloroisocyanuric acid has been added and the reaction has gone to completion, a hydratable salt is added and blended with the reaction mixture until a dry, free-flowing final product mixture is obtained. During this addition water is taken up to form the hydrate of the salt leaving a dry, powdered mixture. The hydratable salt is added in amounts sufficient to absorb all of the water in the reaction mixture as water of hydration and to maintain the water content of the entire final mixture at no higher than 16% by weight of the final mixture. It is preferred to use sodium tripolyphosphate as the hydratable salt. Other hydratable salts which have been found effective include soda ash (sodium carbonate), tetrasodium pyrophosphate, trisodium phosphate, and borax.

In the make-up of the above mixture substantially all of the available chlorine values of the trichloroisocyanuric acid remain in the final mixture. The term "available chlorine" as used herein refers to the amount of chlorine that can be liberated from the compound by treatment with an aqueous acid solution and which can be determined by conventional analysis.

In the make-up of the present mixtures the alkali metal dichloroisocyanurate is formed without the production of any alkali metal chloride, e.g. sodium chloride. This is important because the resultant alkali metal dichloroisocyanurate is free of any side products and requires no processing steps for removal of an alkali metal chloride such as must be carried out in conventional processes. As a result, in the present process the alkali metal dichloroisocyanurate component need not be separated from its residual mother liquor; the entire reaction mixture, comprising essentially the alkali metal dichloroisocyanurate and its mother liquor, is simply mixed with the hydratable salt, e.g. sodium tripolyphosphate, to form a dry, free-flowing, stable final mixture.

In carrying out the present process the trichloroisocyanurate and the alkali metal salt of cyanuric acid combine to form the corresponding alkali metal dichloroisocyanurate in accordance with the following equation:

$$2Cl_3C_3N_3O_3 + M_3C_3N_3O_3 \rightarrow 3MCl_2C_3N_3O_3$$

wherein M is an alkali metal. In the above equation the trialkali metal cyanurate was used to illustrate the formation of the alkali metal dichloroisocyanurate. However, either the mono- or di-alkali metal cyanurate can be used in the present process. The trialkali metal cyanurate is preferred because it yields the greatest proportion of alkali metal dichloroisocyanurate. The use of either the mono- or di-alkali metal cyanurate in combination with the trichloroisocyanuric acid will also yield an alkali metal dichloroisocyanurate, but some isocyanuric acid will be formed as an ancillary product of the reaction. In all events, the total amount of alkali metal dichloroisocyanurate produced is of necessity limited by the amount of alkali metal cyanurate present during the reaction.

In order for the above reaction to proceed, water must be present in the reaction mixture in amounts of at least about 11% by weight of the reaction mixture. This is the minimum amount of water which is necessary to commence conversion of trichloroisocyanuric acid to an alkali metal dichloroisocyanurate. In general the percent conversion of trichloroisocyanuric acid to the alkali metal dichloroisocyanurate in the reaction mixture increases as the water content of the reaction mixture is raised over this minimum amount. However, the water which is present in the reaction mixture must constitute no more than about 16% by weight of the final mixture (including the reaction mixture, the hydratable salt and any other additive); otherwise, on addition of the hydratable salt, e.g. sodium tripolyphosphate, to the reaction mixture the resulting final mixture tends to cake. The optimum water concentrations of the final mixture to obtain a free-flowing, noncaking mixture are from about 7% to about 16% by weight.

The order of addition of the reagents is critical. In general, the trichloroisocyanuric acid should not contact any unreacted alkali metal hydroxide. The trichloroisocyanuric acid must react only with an alkali metal cyanurate, whether formed in situ by mixing an alkali metal hydroxide solution with isocyanuric acid or by direct addition of the trialkali metal cyanurate to water. If any free alkali metal hydroxide contacts the trichloroisocyanuric acid, it results in the formation of an alkali metal chloride. This is undesirable since it reduces the amount of available chlorine in the final composition.

In addition to the above, the hydratable salt such as sodium tripolyphosphate should be added only after completion of the reaction between trichloroisocyanuric acid and the alkali metal cyanurate in solution. If the sodium tripolyphosphate or other hydratable salt is added prior to the complete conversion of the trichloroisocyanuric acid, the hydratable salt will absorb the water in the mixture as water of hydration and prevent any further conversion of trichloroisocyanuric acid to the alkali metal dichloroisocyanurate.

The dry, free-flowing, fast-dissolving mixture of alkali metal dichloroisocyanurate and hydratable salt is useful for cleaning, disinfecting and bleaching applications, particularly, for use in household cleaners or for incorporation in detergent blends used in home laundering. While the present mixtures contain as essential agents an alkali metal dichloroisocyanurate and hydratable salt, preferably sodium tripolyphosphate, they may contain any hydratable phosphate salt, e.g. tetrasodium pyrophosphate, trisodium phosphate and others. Further, the mixtures may contain soluble alkali metal silicates such as sodium silicates having a $Na_2O$ to $SiO_2$ molar ratio of 1:1 to 1:3.6, and preferably, 1:1 to 1:3.5 or the corresponding potassium silicates. In addition, water soluble alkali metal borates such as calcined sodium tetraborate or borax or the water soluble alkali metal carbonates or bicarbonates such as sodium or potassium carbonates may be included. Diluents having some detergent building properties such as neutral alkali metal sulfates or chlorides, e.g. sodium sulfate or sodium chloride, may also be included. In addition the mixtures may contain anionic surface active agents.

The anionic active agents useful in the present mixtures are nonsoap synthetic detergents made up of water soluble salts or organic sulfuric reaction products having from about 8 to about 18 carbon atoms in the form of an alkyl or acyl radical within the molecular structure and containing sulfuric or sulfonic acid ester radicals. Typical examples of these anionic surface active agents are sodium or potassium alkyl benzene sulfonates in which the alkyl group contains from about 8 to about 18 carbon atoms, e.g., sodium dodecyl benzene sulfonate, sodium tridecyl benzene sulfonate; the sodium and potassium alkyl glycerol ether sulfonates, including ethers of higher fatty alcohols derived from the reduction of coconut oils; the reaction products of higher fatty acids, e.g. coconut oil with sodium or potassium isethionate; sodium or potassium alkyl sulfonates and sulfates obtained by sulfonation of coconut or tallow fatty alcohols and mixtures of such alkyl sulfates; dialkyl esters of sodium or potassium salts of sulfosuccinic acid; sodium and potassium salts of sulfated or sulfonated monoglycerides, e.g. those derived from coconut oil; sodium or potassium salts of higher fatty alcohol esters of sulfocarboxylic acids, e.g. sodium salt of lauryl alcohol ester of sulfoacetic acid; and other anionic agents set forth in U.S. Patent 2,486,921, issued to Byerly on Nov. 1, 1949.

The resulting stable, free-flowing, fast-dissolving mixture of alkali metal dichloroisocyanurate and hydratable salt may be used as a powdered mix or further it may be compacted by well known techniques to form tablets. Tablets produced from the above mixes can be produced at much lower tableting pressures than the corresponding mixture made up by separate blending of dry, preformed alkali metal dichloroisocyanurate and sodium tripolyphosphate mixtures. Further, tablets made from the present process show increased strengths and faster dissolving times on aging compared with tablets produced from the corresponding mixture made up by separate blending of dry, preformed alkali metal dichloroisocyanurate and sodium tripolyphosphate.

A preferred composition of the present invention for use in bleaching applications comprises:

| | Percent |
|---|---|
| Sodium dichloroisocyanurate (prepared from trichloroisocyanuric acid) | 40 |
| Trisodium polyphosphate | 30 |
| Ultramarine blue | 0.2 |
| Sodium dodecyl benzene sulfonate | 4.0 |
| Sodium chloride | Balance |

The following examples are given to illustrate the present invention and are not deemed to be limiting thereof.

EXAMPLE 1

A series of powdered bleaching mixtures was made up as set forth below, in which the amounts of ingredients used, is expressed as the weight percent of the total mixture.

Run A.—Sodium hydroxide (7%) was dissolved in water (15.7%) and isocyanuric acid (7.5%) was slowly added to the hydroxide solution. Thereafter, trichloroisocyanuric acid (27.1%) was added slowly with constant agitation. The temperature of the reaction mixture rose from about 20° C. to 58° C. during the ensuing reaction. The reaction was completed after 15 minutes and sodium tripolyphosphate (42.7%) was then added to the reaction mixture with vigorous stirring until a free-flowing, powdered mixture was obtained. The powdered mixture was analyzed for total available chlorine by iodometric titration and for the presence of sodium dichloroisocyanurate by X-ray diffraction analysis. The mixture was found to contain 100% of the available chlorine present in the trichloroisocyanuric acid used as the feed. The X-ray analysis indicated substantially complete conversion of the trichloroisocyanuric acid to sodium dichloroisocyanurate, and the absence of isocyanuric acid, trichloroisocyanuric acid or sodium chloride. The mixture lost only 1.6% of its initial available chlorine after storage for three weeks at room temperature.

*Run B.*—The above procedure was repeated except that 9.8% of potassium hydroxide was dissolved in 15.7% water, and 7.5% of isocyanuric acid was added to the solution. Thereafter, 27.1% of trichloroisocyanuric acid was added slowly to maintain the temperature of the mixture between 60° and 80° C. during the ensuing reaction. After termination of this reaction, 39.9% of sodium tripolyphosphate was added to the reaction mixture, with agitation, until a powdered, free-flowing mixture was obtained. The powdered mixture was analyzed as in Run A for potassium dichloroisocyanurate, and for available chlorine. All of the available chlorine values present in the trichloroisocyanuric acid were present in the final mixture. The X-ray analysis showed that complete conversion of the trichloroisocyanuric acid to potassium dichloroisocyanurate was obtained and that isocyanuric acid, trichloroisocyanuric acid or potassium chloride were absent from the powdered mixture. After storage for three weeks at room temperature, the mixture lost only 0.4% of its initial available chlorine.

*Run C.*—The procedure of Run A was repeated except that 6.2% of sodium hydroxide was dissolved in 6.2% of water, and 6.7% of isocyanuric acid was added to the solution. Thereafter, 24.0% of trichloroisocyanuric acid was added slowly to maintain the temperature of the mix between 60–80° C. during the ensuing reaction. After termination of this reaction 56.9% of sodium tripolyphosphate was added to the mixture, with agitation, until a powdered, free-flowing mixture was obtained. The powdered mixture was analyzed as in Run A and all of the chlorine values present in the trichloroisocyanuric acid were present in the final mixture. The X-ray analysis showed that conversion of the trichloroisocyanuric acid to sodium dichloroisocyanurate was about 30% complete. After storage for three weeks at room temperature, the mixture showed no loss of its initial available chlorine.

*Run D.*—A mixture of trisodium cyanurate (10.7%) and trichloroisocyanuric acid (25.7%) were blended together and 6.0% of water was added to the mixture. The water was added gradually during which the temperature of the reaction mixture rose to about 60° C. At the termination of the reaction 57.6% of sodium tripolyphosphate was added to the mixture, with agitation, until a powdered, free-flowing mixture was obtained. This powdered mixture was analyzed as set forth in Run A and all of the chlorine values present in the trichloroisocyanuric acid were present in the final mixture. Further, the conversion of trichloroisocyanuric acid to sodium dichloroisocyanurate was found to have proceeded about 50%. After storage for three weeks at room temperature, the mixture showed no loss of its initial available chlorine.

*Run E.*—A mixture was made up containing 25.7% of trichloroisocyanuric acid and 21.4% of an equimolar mixture of monosodium cyanurate and disodium cyanurate. To this mixture was added 6.0% of water. The water was added slowly, with agitation, so that the temperature of the reaction mixture did not rise above 80° C. in the ensuing reaction. After the termination of the reaction sodium tripolyphosphate (46.9%) was added to the reaction mixture, with agitation, until a powdered, free-flowing mixture was obtained. The powdered mixture was analyzed as in Run A for the presence of available chlorine, and for sodium dichloroisocyanurate. Substantially all of the chlorine values present in the trichloroisocyanuric acid were present in the final mixture. The X-ray analysis showed that conversion of the trichloroisocyanuric acid to sodium dichloroisocyanurate proceeded about 25%, and that the mixture also contained isocyanuric acid. After storage for three weeks at room temperature, the mixture showed no loss of its initial available chlorine.

In the above example, Runs A and C illustrate the use of the in-situ technique for forming sodium cyanurate as one of the reactants while Runs D and E were carried out with preformed sodium cyanurate. In Run D trisodium cyanurate was employed whereas in Run E an equimolar mixture of monosodium cyanurate and disodium cyanurate was employed. It will be further observed in Runs C, D, and E that conversion of the trichloroisocyanuric acid to sodium dichloroisocyanurate did not proceed to completion because of the limited amount of water available for carrying out the reaction. However, where the amount of water was increased as in Runs A and B, the reaction goes to completion and all of the trichloroisocyanuric acid is converted to the corresponding alkali metal dichloroisocyanurate.

EXAMPLE 2

*Run A—Process of the invention.*—A dry bleach tablet was prepared as set forth below in which the amount of ingredients used is expressed as the weight percent of the total mixture. Sodium hydroxide (7.4%) was dissolved in water (5.5%) and isocyanuric acid (7.8%) was slowly added to the hydroxide solution. Thereafter, trichloroisocyanuric acid (28.7%) was added slowly with constant agitation. The temperature of the reaction mixture rose from about room temperature to about 60° C. during the ensuing reaction. After completion of the reaction, sodium tripolyphosphate powder (29.9%) was added with vigorous stirring until a free-flowing, powdered mixture was obtained. Thereafter, dendritic sodium chloride (17.0%) was added to the powdered mixture along with ultramarine blue (0.2%) and Sulframin AB 40 beads (4.0%). The Sulframin AB 40 beads are a spray dried powder product made by Ultra Chemical Works having a bulk density of about 0.30 g./cc. and composed of 40%, by weight, sodium dodecyl benzene sulfonate and 60% sodium sulfate. This product also contains from about 5% to about 10% moisture in the form of water of hydration with the sodium sulfate.

The above powdered mixture was agitated in a Kitchen-Aid planetary mixer (Model 4–C, Hobart Manufacturing Co., Troy, Ohio) for about 3½ minutes. Thereafter, the formulations were pressed into tablets weighing from 50–51 g. and having a thickness of 26 mm. under a tableting pressure of 3,000 lbs. force on the ram. A portion of the tablets were tested for strength by being pressed on edge immediately after formation. A second portion was tested for disintegration time. The remaining tablets were allowed to age for three weeks in open storage under ambient conditions. After aging the tablets as set forth above, their disintegration times were determined and are reported in Table I along with the crushing strengths prior to and subsequent to storage.

*Run B—Prior art process.*—A dry bleach tablet was prepared as set forth below in which the amounts of ingredients are expressed as the weight percent of the total mixture. A dry mixture was made up by blending together sodium dichloroisocyanurate (40%), sodium tripolyphosphate (30%), ultramarine blue (0.2%) and Sulframin AB 40 beads (4.0%) and the balance dendritic sodium chloride. The resulting mixture was mixed, as set forth in Run A, for about 3½ minutes and then was pressed into tablets weighing 51–52 g. The tableting pressure required was 17,000 lbs. force on the ram and yielded a tablet having thickness of 24 mm. A portion of the resulting tablets were tested for strength by being pressed on edge immediately after formation. Another portion was tested for disintegration time. The remainder were allowed to age for three weeks in open storage at ambient conditions, in the same manner as set forth in Run A.

After aging of the tablets was completed, the disintegration times of the tablets were determined and are reported in Table I along with the crushing strengths prior to and subsequent to storage.

TABLE I

|  | Formulation | |
| --- | --- | --- |
|  | A | B |
| Tablet weight (g.) | 50–51 | 51–52 |
| Tablet pressure (lbs.) | 3,000 | 17,000 |
| Tablet thickness (mm.) | 26 | 24 |
| Crush Strength (lbs.): |  |  |
| Initial | 45 | 60 |
| After Storage | 60 | 34 |
| Disintegration Time (sec.):[1] |  |  |
| Initial | 120 | 64 |
| After Storage | 120 | 191 |

[1] Tests made in a 16-gallon Kenmore transparent-sided washer in wash water maintained at 120° F. Disintegration is deemed to be complete when no pieces larger than ⅛ in. in diameter remain.

As will be observed from Table I, the tablets produced by the present process, Run A, had lower initial crush strengths than tablets made by a conventional prior art process, but on storage the crush strength of the instant tablets increased while the crush strength of the prior art tablets, Run B, decreased. Further, the disintegration time of the instant tablets was initially higher than that of the conventionally produced detergent tablets. However, on storage the instant tablets did not increase in disintegration time while those of the prior art showed disintegration times far greater than those of the present process. This indicates that the tablets produced as set forth in Run A, which is the process of the present invention, will be superior to those produced by conventional prior art processes, Run B, after both have been aged by normal storage or inventory hold up.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of producing fast-dissolving, stable, free-flowing mixtures of an alkali metal dichloroisocyanurate and a hydratable salt selected from the group consisting of sodium tripolyphosphate, tetrasodium pyrophosphate, trisodium phosphate, sodium carbonate and borax which comprises reacting trichloroisocyanuric acid and an alkali metal cyanurate in a reaction mixture containing at least about 11% by weight of water at temperatures of up to about 80° C., adding a hydratable salt to the above reaction mixture in amounts sufficient to absorb all of the water in said reaction mixture as water of hydration and to obtain a water content in the resulting final mixture of no greater than about 16% by weight of said final mixture, and recovering a free-flowing, fast-dissolving, stable mixture of an alkali metal dichloroisocyanurate and the said salt.

2. Process of claim 1 in which the alkali metal cyanurate is a sodium cyanurate.

3. Process of claim 1 in which the alkali metal cyanurate is a potassium cyanurate.

4. Process of claim 1 in which the temperature is maintained at about 15° to about 80° C.

5. Process of claim 1 in which the temperature is maintained at about 60° to about 80° C.

6. Process of producing fast-dissolving, stable, free-flowing mixtures of an alkali metal dichloroisocyanurate and sodium tripolyphosphate which comprises reacting trichloroisocyanuric acid and an alkali metal cyanurate in a reaction mixture containing at least about 11% by weight of water at temperatures of up to about 80° C., adding sodium tripolyphosphate to the above reaction mixture in amounts sufficient to absorb all of the water in said reaction mixture as water of hydration and to obtain a water content in the resultant final mixture of no greater than about 16% by weight of said final mixture, and recovering a fast-dissolving, free-flowing, stable mixture of an alkali metal dichloroisocyanurate and sodium tripolyphosphate.

7. Process of claim 6 in which the alkali metal cyanurate is trisodium cyanurate and the final mixture consists essentially of sodium dichloroisocyanurate and sodium tripolyphosphate.

8. Process of producing fast-dissolving, strong bleach tablets which comprises reacting trichloroisocyanuric acid and an alkali metal cyanurate in a reaction mixture containing at least about 11% by weight of water at temperatures of up to about 80° C., adding a hydratable salt selected from the group consisting of sodium tripolyphosphate, tetrasodium pyrophosphate, trisodium phosphate, sodium carbonate and borax to the above reaction mixture in an amount sufficient to absorb all of the water in said reaction mixture as water of hydration and to obtain a water content in the resulting final mixture of no greater than about 16% by weight of said final mixture, recovering a free-flowing, stable powdered mixture of an alkali metal dichloroisocyanurate and said salt, and compressing said powdered mixture into tablets.

9. Process of claim 8 in which the alkali metal cyanurate is sodium cyanurate.

10. Process of claim 8 in which the alkali metal cyanurate is potassium cyanurate.

11. Process of claim 8 in which the hydratable salt is sodium tripolyphosphate.

12. Process of producing fast-dissolving, strong bleach tablets which comprises reacting trichloroisocyanuric acid with trisodium cyanurate in a reaction mixture containing at least about 11% by weight of water, at temperatures up to about 80° C., adding sodium tripolyphosphate to the above reaction mixture in amounts sufficient to hydrate all of the water in said reaction mixture and to obtain a water content in the resulting final mixture of no greater than about 16% by weight of said final mixture, recovering a free-flowing, powdered mixture of sodium dichloroisocyanurate and sodium tripolyphosphate, pressing said powdered mixture into tablets under pressures of up to about 3,000 lbs. force on the ram and recovering a bleach tablet consisting essentially of sodium dichloroisocyanurate and sodium tripolyphosphate.

References Cited

UNITED STATES PATENTS

| 3,035,057 | 5/1962 | Symes et al. | 252—99 X |
| 3,108,969 | 10/1963 | Symes | 252—99 |
| 3,120,378 | 2/1964 | Lee et al. | 252—99 X |
| 3,213,029 | 10/1965 | Muchow et al. | 252—99 |

LEON D. ROSDOL, *Primary Examiner.*

M. WEINBLATT, *Assistant Examiner.*